Patented Feb. 3, 1931

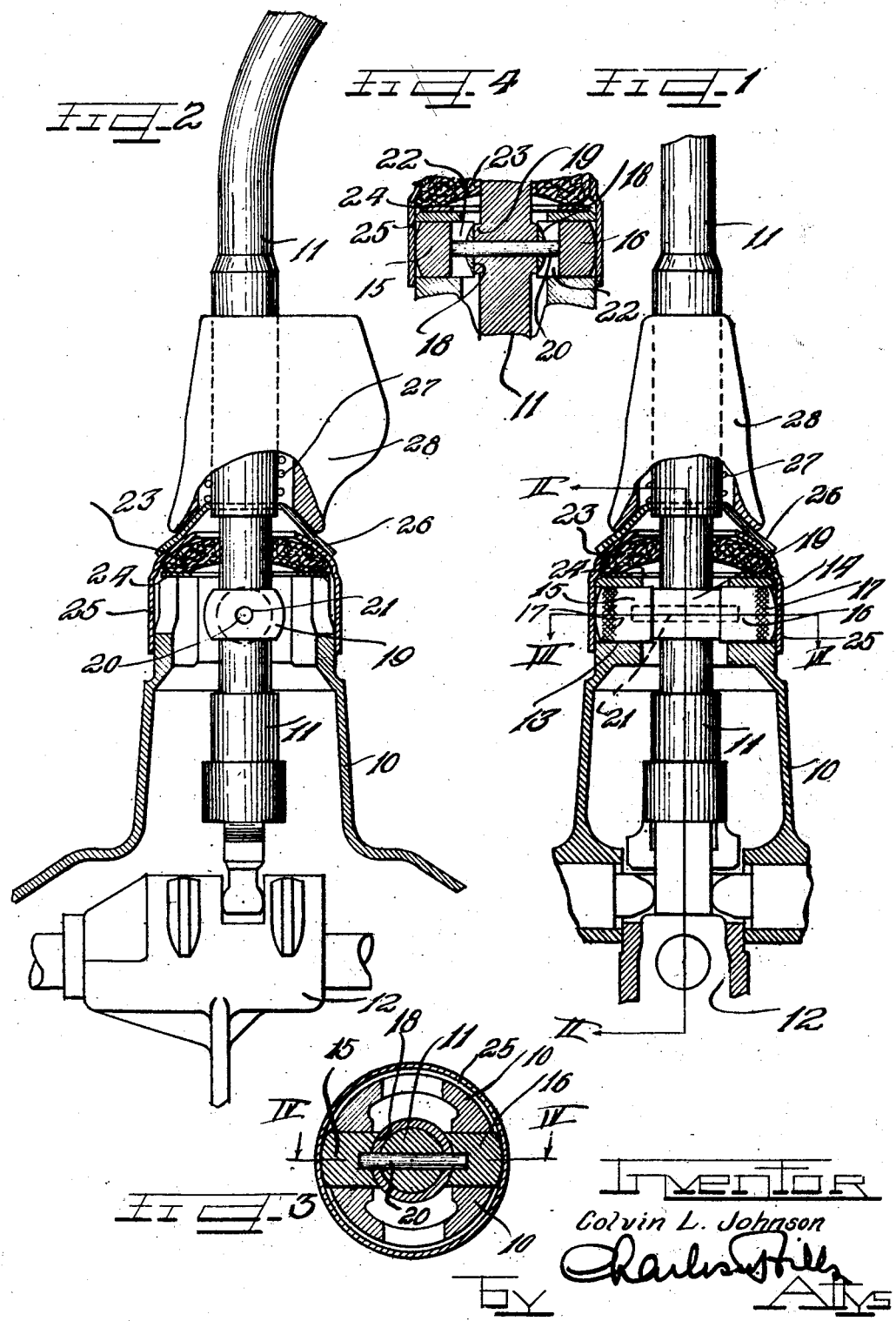

1,790,667

UNITED STATES PATENT OFFICE

COLVIN L. JOHNSON, OF ST. LOUIS, MISSOURI, ASSIGNOR, BY MESNE ASSIGNMENTS, TO FRANK C. WEBB, OF ST. LOUIS, MISSOURI

TRANSMISSION-GEAR-SHIFTING ASSEMBLY

Application filed November 24, 1926. Serial No. 150,423.

This invention relates to transmission gear shifting means, and more particularly to means for enabling the convenient assembly of component parts thereof.

It contemplates more especially the provision of means to enable the ready assembly of a gear shift lever unit preferably equipped with transmission locking means, thereby rendering it necessary or at least highly desirable to have the component elements thereof inaccessible.

Known gear shifting constructions resort to a pin mounted shift lever pivotally associated with the transmission housing, the pin being driven between aligned apertures in the housing and lever. This arrangement is not altogether satisfactory on transmission gear shifting instrumentalities having selectively operable locks associated therewith to prevent unauthorized manipulation of the shifting lever, since the pin is accessible and capable of being removed to enable the gears to be shifted by means of any contrivance inserted therein.

One object of the present invention is to simplify the construction and improve the operation of devices of the character mentioned.

Another object is to provide simple gear shift lever mounting means to enable the convenient assembly thereof.

A further object is to provide novel gear shift mounting means which are inaccessible and incapable of removal in the locked position of the lever.

Other objects and advantages will appear from the following description of an illustrated embodiment of the present invention.

In the drawings:

Figure 1 is a sectional view in elevation of a device embodying features of the present invention.

Figure 2 is a sectional view taken substantially along line II—II of Figure 1.

Figure 3 is a sectional view taken substantially along line III—III of Figure 1.

Figure 4 is a fragmentary sectional view taken substantially along line IV—IV of Figure 3.

The structure selected for illustration comprises a transmission housing 10 of standard construction having a gear shift lever 11 projecting therein to selectively engage the usual gear shifting instrumentalities 12. The housing 10, in this instance, is provided with aligned apertures 13 and 14 in proximity to the mouth thereof to receive instrumentalities for enabling the gear shift lever 11 to be operatively connected thereto without rendering it difficult to assemble the component parts thereof which preferably are inaccessible from the exterior of the housing. The instrumentalities, in this instance, comprise the plugs 15 and 16 which are preferably knurled as at 17 to tightly embrace the interior of the apertures 13 and 14 wherein they are driven to provide confronting faces 18, in this instance of arcuate configuration. A projection 19 constituting a shoulder having an arcuate periphery conforming in curvature with the confronting faces 18 of the lugs 15, co-operates therewith to effect sliding engagement therebetween. The shoulder 19 may be formed integral with or is otherwise secured to that portion of the lever 11 which is confined within the housing 10.

The lever 11 is operatively connected to the housing 10 to permit pivotal movement thereof in intersecting planes, by means of a pivot pin 20 which is lodged in an aperture 21 extending through the shoulder 19 diametrically thereof, the pin 20 being driven therein so as to have the extremities thereof projecting beyond the surface of the shoulder 19 so as to present exteriorly projecting extremities. The pin 20 is guided in suitable slots 22 diametrically disposed in the confronting faces of the plugs 15 and 16 in communication with the arcuate recesses 18 thereof, whereby movement of the lever 11 may be effected in intersecting planes as is necessary or at least highly desirable to selectively shift the gears contained in the transmission housing 10 by virtue of the instrumentalities 12 engageable with the extremity of the lever 11.

An oil retaining washer 23 of felt or other suitable material is supported on a retaining plate 24 in embracing relation with the lever 11, there being a housing cover 25 superimposed above the washer 23 with the dish walls thereof projecting over the mouth of the housing 10 to render the plugs 15 and 16 inaccessible from the exterior thereof. A dust plate 26 embraces the lever 11 and engages the housing cover 25 to retain the component elements in assembled relation. The cover 25 is maintained in position by means of a spiral spring 27 which envelops the lever 11 within a lock housing 28 slidably mounted on the lever 11 to contact with the dust plate 26 in its downward locked position. Disposed in the locking housing 27 is a suitable locking cylinder 35 for operating a plunger 36 arranged to engage in a slot 37 in the lever 11 to lock the dust plate 26 against displacement.

With the arrangement of parts above described it will be apparent that the lever 11 is operatively associated with the housing 10 by means of the plugs 15 and 16 which are detachably associated with the housing and the lever 11 to permit the component elements thereof to be readily assembled without enabling access thereto from the exterior of the housing 10 when the locking member 28 is moved to its extreme downward position which simultaneously locks the shifting instrumentalities 12 as well as maintains the cover 25 in position over the plugs 15 and 16.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. The combination with a transmission housing, a gear shift lever associated therewith, a pin projecting from said lever within the confines of said housing, and means removably positioned in said housing in which one end of said pin extends and is pivotally mounted.

2. The combination with a transmission housing, a gear shift lever associated therewith, a pin projecting from said lever within the confines of said housing, and means in said housing movably associated with the end of said pin to permit pivotal movement of said lever, said means being detachable from said housing to enable the convenient assembly of said lever with said housing.

3. The combination with a transmission housing, a gear shift lever, a pin connected to said lever within the confines of said housing, there being aligned depressions in said housing, and plugs detachably mounted in said depressions in axial relation with said pin, said plugs being slotted to receive the ends of said pin whereby said lever is pivotal in intersecting planes.

4. The combination with a transmission housing, a gear shifting lever, an arcuate projection on said gear shift lever within the confines of said housing, and means having confronting arcuate faces detachably associated with said housing and arcuate projection to operatively connect said lever to said housing.

5. The combination with a transmission housing, a gear shifting lever, an arcuate projection on said gear shift lever within the confines of said housing, means having confronting arcuate faces detachably associated with said housing and arcuate projection to operatively connect said lever to said housing, there being slots in the arcuate faces of said detachable means, and a pin projecting through the arcuate projection of said lever, the extremities of said pin being guided in said slots.

In testimony whereof I have hereunto subscribed my name.

COLVIN L. JOHNSON.